United States Patent [19]

Eichelsheim

[11] 4,411,332
[45] Oct. 25, 1983

[54] TILTCAB TRUCK WITH A SAFETY LATCH CYLINDER

[75] Inventor: Alexander V. Eichelsheim, Oldenzaal, Netherlands

[73] Assignee: Applied Power Inc., Milwaukee, Wis.

[21] Appl. No.: 316,369

[22] Filed: Oct. 29, 1981

[51] Int. Cl.³ .............................................. B62D 23/00
[52] U.S. Cl. ............................ 180/89.14; 137/614.17; 296/190
[58] Field of Search ............... 180/89.13, 89.14, 89.15, 180/89.16; 296/35.1, 190; 91/44, 45; 137/614.17; 251/325, 284

[56] References Cited

U.S. PATENT DOCUMENTS

| | | | |
|---|---|---|---|
| 3,831,999 | 8/1974 | Sonneborn | 180/89.14 |
| 3,841,693 | 10/1974 | Reynolds | 180/89.14 |
| 3,985,194 | 10/1976 | Knutson | 180/89.15 |
| 4,174,016 | 11/1979 | Levington | 180/89.15 |
| 4,313,466 | 2/1982 | Adams | 137/614.17 |

FOREIGN PATENT DOCUMENTS 2260173  6/1973  Fed. Rep. of Germany ... 180/89.14

*Primary Examiner*—David M. Mitchell
*Assistant Examiner*—John A. Carroll
*Attorney, Agent, or Firm*—John J. Byrne

[57] ABSTRACT

Disclosed is a safety latch cylinder for a tiltcab truck. The safety latch cylinder comprises a hydraulic cylinder extension of which unlatches a cab latch mechanism and a bypass to tank through the hydraulic cylinder. The hydraulic cylinder is in hydraulic series with the tilt cylinder(s), and, when the hydraulic cylinder is prevented from extending to unlatch the cab latch mechanism, hydraulic fluid is returned to tank through the hydraulic cylinder, preventing extension of the tilt cylinder(s).

15 Claims, 5 Drawing Figures

TILTCAB TRUCK WITH A SAFETY LATCH CYLINDER

TECHNICAL FIELD

This invention relates to systems for tilting truck cabs relative to the truck frames to expose the truck motors for maintenance. In particular, it relates to such systems having means for preventing extension of the tilt cylinder(s) while the cab latch mechanism is latching the cab to the truck frame.

BACKGROUND OF THE INVENTION

In the design of tiltcab trucks, it is extremely important that the cab latch mechanism open before the tilt cylinder(s) begin to extend. If the cab latch mechanism does not open before the tilt cylinder(s) begin to extend, extension of the tilt cylinder(s) damages or destroys the cab latch mechanism and can also overstress and damage the cab structure.

While many devices are known for accomplishing the foregoing general result, all are more or less complicated and therefore expensive and prone to failure to a greater or lesser degree. Accordingly, a need has been perceived for such a device which is simpler, sturdier, and less expensive than previously known devices for accomplishing this result.

BRIEF SUMMARY OF THE INVENTION

A safety latch cylinder according to this invention comprises a hydraulic cylinder extension of which unlatches a cab latch mechanism and a bypass to tank through the hydraulic cylinder. The hydraulic cylinder is in hydraulic series with the tilt cylinder(s), and, when the hydraulic cylinder is prevented from extending to unlatch the cab latch mechanism, hydraulic fluid is returned to tank through the hydraulic cylinder, preventing extension of the tilt cylinder(s).

DETAILED DESCRIPTION OF A PREFERRED EMBODIMENT OF THE INVENTION

Figures 1, 2:
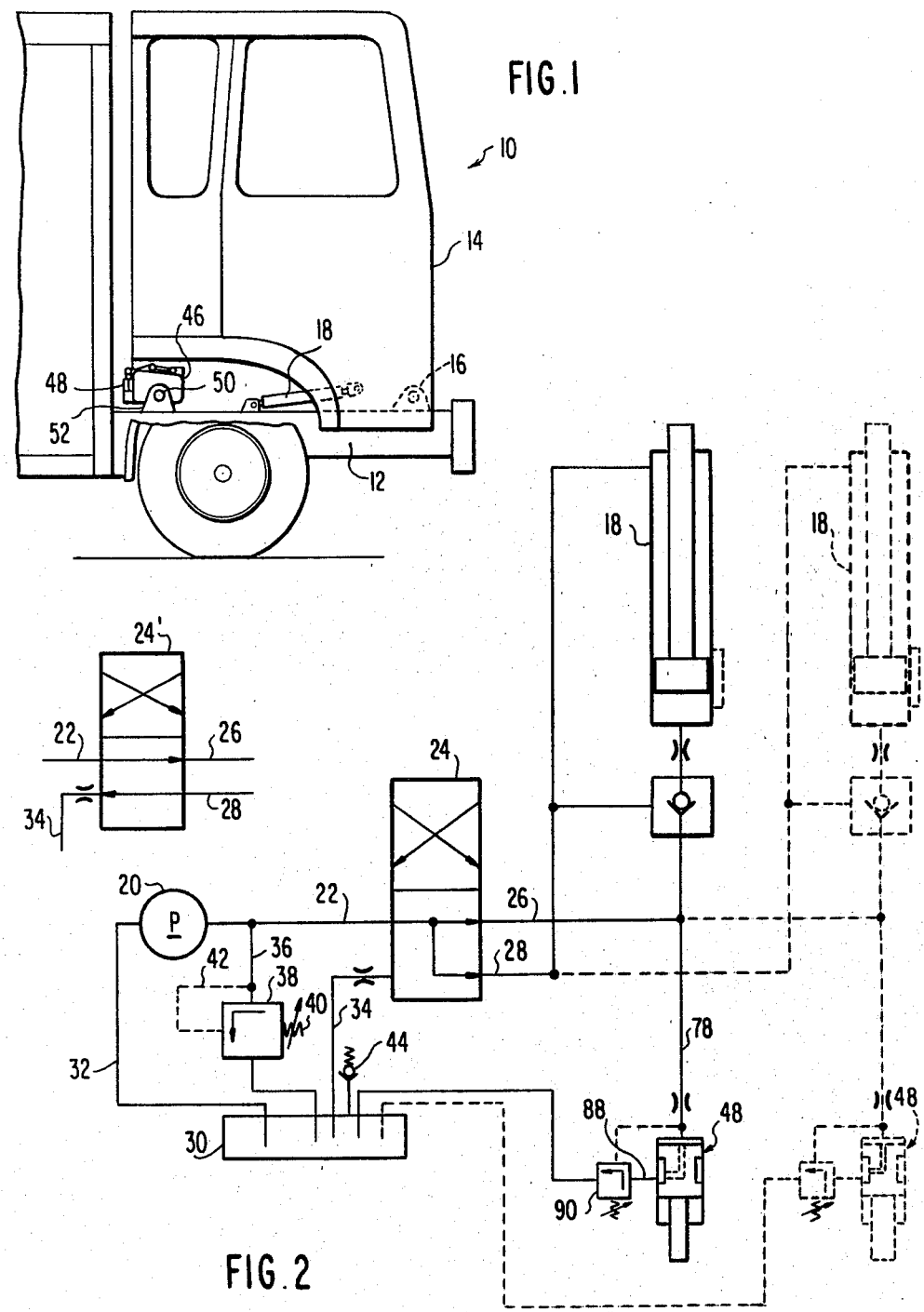
FIG. 1 is a schematic view of a tiltcab truck according to this invention with portions broken away to show the combination hydraulic cylinder and safety valve.
FIG. 2 is a hydraulic schematic drawing showing the hydraulic components of a tiltcab truck according to this invention.

FIG. 1 shows a tiltcab truck 10 comprising a chassis member 12, a cab member 14 mounted on the chassis member 12 for pivotal movement about an axis 16 from the lowered first position shown in the drawing to a raised second position. One or more tilt cylinders 18 are operatively connected to the chassis member 12 and to the cab member 14 to pivot the cab member 14 back and forth between its first and second positions.

Turning to FIG. 2, a pump 20 supplies hydraulic fluid under pressure to the tilt cylinders 18 via hydraulic conduit 22, control valve 24, and hydraulic conduits 26 and 28. The pump 20 obtains its hydraulic fluid from reservoir 30 via hydraulic conduit 32, and hydraulic fluid is returned to the reservoir 30 from the control valve 24 via hydraulic conduit 34.

A hydraulic conduit 36 containing a bypass valve 38 permits hydraulic fluid from the conduit 22 to return directly to the reservoir 30 when the pressure in the conduit 22 exceeds a predetermined minimum value. The bypass valve 38 is normally biased shut by a spring 40, but pressure in the conduit 22 acting through a pressure tap 42 moves the bypass valve 38 to the right in FIG. 2 against the spring 40, ultimately allowing the hydraulic fluid to return to the reservoir 30 through the conduit 36.

A spring biased valve 44 is provided to vent gaseous overpressures in the reservoir 30 above the hydraulic fluid.

Returning to FIG. 1, a cab latch mechanism 46 (better seen in FIG. 3) is provided for latching the cab member 14 to the chassis member 12 when the cab member 14 is in its first position. Adjacent the cab latch mechanism 46 is means 48 for preventing extension of the tilt cylinders 18 while the cab latch mechanism 46 is latching the cab member 14 to the chassis member 12.

Figure 3:
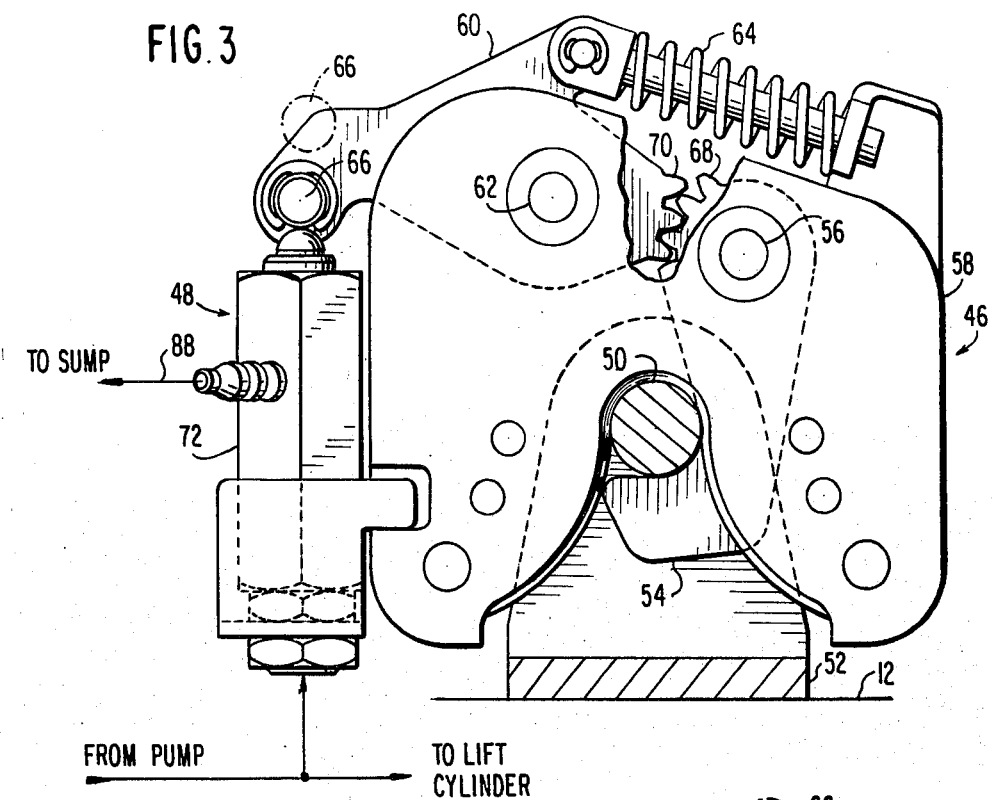
FIG. 3 is a partially sectional view showing the combination hydraulic cylinder and safety valve and the cab latch mechanism.

A cab latch mechanism 46 which is conventional per se is shown in FIG. 3. (As will be appreciated, the means 48 could be used with a wide variety of specifically different cab latch mechanisms, and the cab latch mechanism 46 is shown and described only for purposes of illustration.) The cab latch mechanism 46 comprises a horizontal stub shaft 50 which is mounted on the chassis member 12 via mounting brackets 52. A latch 54 which cooperates with the stub shaft 50 is pivotally mounted on an axle 56. The axle 56 is mounted in a housing 58, which in turn is mounted on the cab member 14. An actuating arm 60 is pivotally mounted on an axle 62 which is also mounted on the housing 58. The actuating arm 60 is biased in the counterclockwise direction in FIG. 3 by a spring 64 which bears against an extension of the housing 58. The actuating arm 60 carries a spherical bearing 66 which is maintained in contact with the means 48 by the spring 64. The latch 54 and the actuating arm 60 having meshing gear sectors 68 and 70. Thus, when the actuating arm 60 is moved from its first, or "over-the-road," position (shown in solid line in FIG. 3) to its second, or unlatched, position (suggested by the broken line position of the spherical bearing 66), the latch 54 is moved from the position shown in FIG. 3, in which engages the stub shaft 50, to a position in which the latch 54 will clear the stub shaft 50 as the cab member 14 is rotated about the axis 16.

Figure 4:
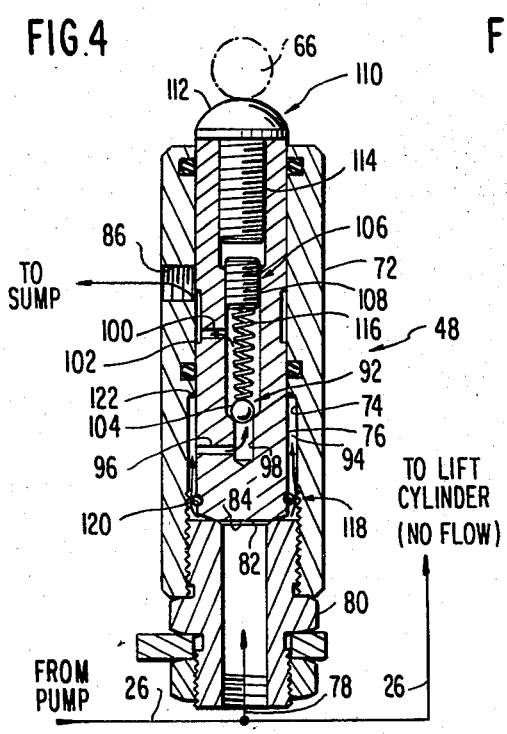
FIG. 4 is a cross-sectional view of the combination hydraulic cylinder and safety valve in its retracted position.
Figure 5:
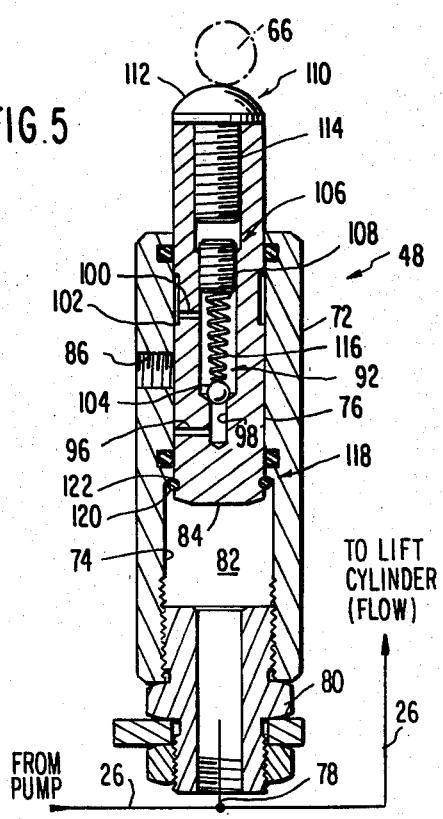
FIG. 5 is a cross-sectional view of the combination hydraulic cylinder and safety valve in its extended position.

The means 48, which is illustrated in detail in FIGS. 4 and 5, comprises a combination hydraulic cylinder and safety valve in hydraulic series with the tilt cylinders 18. Specifically, it comprises a housing 72 mounted on the housing 58 and containing a longitudinal bore 74 open at the upper end to the exterior of the housing 72. A longitudinal member 76 is slidably received in the longitudinal bore 74 and projects to the exterior of the housing 72, where it bears against the spherical bearing 66. As will be apparent, the longitudinal member 76 is movable between a retracted first position (shown in FIG. 4) in which the cab latch mechanism 46 is closed and a projecting second position (shown in FIG. 5) in which the cab latch mechanism 46 is open.

A hydraulic conduit 78 leads from the hydraulic conduit 26 to a connector plug 80 which is threadedly mounted in the downstream end of the longitudinal bore 74. Hydraulic fluid from the pump 20 thus flows through the hydraulic conduit 22, the control valve 24, the hydraulic conduit 26, the hydraulic conduit 78, and the connector plug 80 to a chamber 82 in the longitudinal bore 74 upstream of a reaction surface 84 on the longitudinal member 76.

A threaded radial bore 86 leads from the longitudinal bore 74 downstream of the chamber 82, and a hydraulic conduit 88 containing a bypass valve 90 similar to the bypass valve 38 leads from the radial bore 86 to the reservoir 30.

A path of fluid communication 92 leads from the chamber 82, through the longitudinal member 76, and to the exterior of the longitudinal member 76 at a point where it is in fluid communication with the radial bore 86 when the longitudinal member 76 is in its first position (shown in FIG. 4) but is not in fluid communication with the radial bore 86 when the longitudinal member 76 is in its second position (shown in FIG. 5). In the presently preferred embodiment, the path of fluid communication 92 begins with an annular clearance 94 between the longitudinal member 76 and the housing 72, followed by a radial bore 96 leading to a stepped axial bore 98 in the longitudinal member 76, but it will be appreciated that the annular clearance 94 and the radial bore 96 could be eliminated if the stepped axial bore 98 were extended through to communicate directly with the chamber 82. Similarly, the path of fluid communication 92 ends with a radial bore 100 leading from the stepped axial bore 98 to an annular relief 102 in the longitudinal member 76, but it will be appreciated that the annular relief 102 in the longitudinal member 76 could be replaced with an annular relief in the housing 72.

A one-way valve 104 is located in the stepped axial bore 98. The one-way valve 104 is oriented so that and has a rating such that it opens at a pressure less than the pressure required to extend the tilt cylinders 18, permitting hydraulic fluid to flow to the reservoir 30 through the radial bore 100, the annular relief 102, the radial bore 86, and the hydraulic conduit 88. This bypass of the hydraulic fluid prevents pressure from building up in the hydraulic conduit 26 sufficiently to extend the tilt cylinders 18 so long as the annular relief 102 remains in communication with the radial bore 86—which it will do, for instance, if the cab latch mechanism 46 is held in the latched condition by some obstruction. However, once the annular relief 102 has moved beyond the radial bore 86, flow through the longitudinal member 76 ceases, pressure builds up in the chamber 82 to fully extend the longitudinal member 76 (thereby fully unlatching the latch mechanism 46), and pressure builds up in the conduit 26, thereby extending the tilt cylinders 18.

Moreover, in the presently preferred embodiment, the path of fluid communication 92 is also interrupted once the radial bore 96 passes beyond the annular clearance 94, which is at approximately the same time. However, as previously stated, the annular clearance 94 and the radial bore 96 can be replaced with an axial extension of the stepped axial bore 98.

Means 106 are preferably provided for adjusting the rating of the one-way valve 104. In the presently preferred embodiment, the means 106 comprise a threaded plug 108 received in the stepped axial bore 98 downstream of the radial bore 100. An end plug 110 comprising a hemispherical bearing surface 112 and a threaded shaft 114 is threadedly received in the upper end of the axial stepped bore 98. As will be apparent, the end plug 110 can easily be removed to provide access to the threaded plug 108, and axial adjustment of the threaded plug 108 effects the spring force exerted on the one-way valve 104 by spring 116.

Means 118 are preferably provided for preventing the longitudinal member 76 from sliding outwardly beyond its second position. In the presently preferred embodiment, the means 118 comprise a peripheral abutment surface in the form of a snap ring 120 on the longitudinal member 76 and a cooperating abutment surface 122 in the longitudinal bore 74 at the top of the annular clearance 94. Contact of the snap ring 120 with the abutment surface 122 (as shown in FIG. 5) provides the upper limit to the travel of the longitudinal member 76.

Caveat

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiments.

I claim:
1. In a motor vehicle comprising:
   (a) a chassis member;
   (b) a cab member mounted on said chassis member for pivotal movement about an axis transverse to the longitudinal axis of said chassis member from a lowered first position to a raised second position;
   (c) at least one tilt cylinder operatively connected to said chassis member and to said cab member to pivot said cab member back and forth between its first and second positions;
   (d) a pump for supplying hydraulic fluid under pressure to said tilt cylinder;
   (e) a reservoir for hydraulic fluid,
   (f) a cab latch mechanism for latching said cab member to said chassis member when said cab member is in its first position; and
   (g) first means for preventing extension of said tilt cylinder while said cab latch mechanism is latching said cab member to said chassis member,
the improvement wherein said first means comprises a combination hydraulic cylinder and safety valve in hydraulic series with said tilt cylinder, said combination hydraulic cylinder and safety valve comprising:
   (h) a housing containing a longitudinal bore open at one end to the exterior of said housing;
   (i) a longitudinal member slidably received in said longitudinal bore and projecting to the exterior of said housing, where it is operatively connected to said cab latch mechanism, said longitudinal member being movable between a retracted first position in which said cab latch mechanism is closed and a projecting second position in which said cab latch mechanism is open;
   (j) a first path of fluid communication from said pump to a chamber in said longitudinal bore upstream of a reaction surface on said longitudinal member and from said pump to said tilt cylinder;

(k) a second path of fluid communication from said longitudinal bore downstream of said chamber, through said housing, and to said reservoir;

(l) a third path of fluid communication from said chamber, through said longitudinal member, and to the exterior of said longitudinal member at a point where it is in fluid communication with said second path of fluid communication when said longitudinal member is in its first position but is not in fluid communication with said second path of fluid communication when said longitudinal member is in its second position; and (m) a one-way valve located in said third path of fluid communication, said one-way valve being oriented so that and having a rating such that it will open at a pressure less than the pressure required to extend said tilt cylinder, permitting hydraulic fluid to flow to said reservoir through said first, third, and second paths of fluid communication and preventing said tilt cylinder from extending if said longitudinal member is prevented from moving from its first position to its second position, opening said latch mechanism.

2. In a motor vehicle as recited in claim 1, the further improvement comprising second means for preventing said longitudinal member from sliding outwardly beyond its second position.

3. In a motor vehicle as recited in claim 2, the further improvement wherein said second means comprise a peripheral abutment surface on said longitudinal member and a cooperating abutment surface in said longitudinal bore.

4. In a motor vehicle as recited in claim 1, the further improvement comprising third means for adjusting the rating of said one-way valve.

5. In a motor vehicle as recited in claim 1, the further improvement wherein said third path of fluid communication comprises an annular relief in said longitudinal member.

6. A motor vehicle comprising:
(a) a chassis member;
(b) a cab member mounted on said chassis member for pivotal movement about an axis transverse to the longitudinal axis of said chassis member from a lowered first position to a raised second position;
(c) at least one tilt cylinder operatively connected to said chassis member and to said cab member to pivot said cab member back and forth between its first and second positions;
(d) a pump for supplying hydraulic fluid under pressure to said tilt cylinder;
(e) a reservoir for hydraulic fluid;
(f) a cab latch mechanism for latching said cab member to said chassis member when said cab member is in its first position; and
(g) first means for preventing extension of said tilt cylinder while said cab latch mechanism is latching said cab member to said chassis member, said first means comprising:
  (i) a housing containing a longitudinal bore open at one end to the exterior of said housing;
  (ii) a longitudinal member slidably received in said longitudinal bore and projecting to the exterior of said housing, where it is operatively connected to said cab latch mechanism, said longitudinal member being movable between a retracted first position in which said cab latch mechanism is closed and a projecting second position in which said cab latch mechanism is open;
  (iii) a first path of fluid communication from said pump to a chamber in said longitudinal bore upstream of a reaction surface on said longitudinal member and from said pump to said tilt cylinder;
  (iv) a second path of fluid communication from said longitudinal bore downstream of said chamber, through said housing, and to said reservoir;
  (v) a third path of fluid communication from said chamber, through said longitudinal member, and to the exterior of said longitudinal member at a point where it is in fluid communication with said second path of fluid communication when said longitudinal member is in its first position but not in fluid communication with said second path of fluid communication when said longitudinal member is in its second position; and
  (vi) a one-way valve located in said third path of fluid communication, said one-way valve being oriented so that and having a rating such that it will open at a pressure less than the pressure required to extend said tilt cylinder, permitting hydraulic fluid to flow to said reservoir through said first, third, and second paths of fluid communication and preventing said tilt cylinder from extending if said longitudinal member is prevented from moving from its first position to its second position, opening said latch mechanism.

7. A motor vehicle as recited in claim 6 and further comprising second means for preventing said longitudinal member from sliding outwardly beyond its second position.

8. A motor vehicle as recited in claim 7 wherein said second means comprise a peripheral abutment surface on said longitudinal member and a cooperating abutment surface in said longitudinal bore.

9. A motor vehicle as recited in claim 6 and further comprising third means for adjusting the rating of said one-way valve.

10. A motor vehicle as recited in claim 6 wherein said third path of fluid communication comprises an annular relief in said longitudinal member.

11. A combination hydraulic cylinder and safety valve comprising:
(a) a housing containing a longitudinal bore open at one end to the exterior of said housing;
(b) a longitudinal member coaxially received in said longitudinal bore and projecting to the exterior of said housing, said longitudinal member being axially slidable within said bore between a retracted first position and a projecting second position wherein said longitudinal member axially extends through said opening at one end of said housing;
(c) a first path of fluid communication for supplying hydraulic fluid under pressure to a chamber in said longitudinal bore upstream of a reaction surface on said longitudinal member;
(d) a second path of fluid communication for conducting hydraulic fluid from second longitudinal bore downstream of said chamber, through said housing, and to a reservoir;
(e) a third path of fluid communication from said chamber, through said longitudinal member, and to the exterior of said longitudinal member at a point where it is in fluid communication with said second path of fluid communication when said longitudinal member is in its first position but is not in fluid communication with said second path of fluid communication when said longitudinal member is in its second position due to the force of hydraulic fluid under pressure acting against said reaction surface on said longitudinal member; and (f) a one-way valve located in said third path of fluid communication, said one-way valve being oriented so that and having a rating such that it will open at a predetermined pressure, permitting hydraulic fluid to flow to the reservoir through said first, third, and second paths of fluid communication if said longitudinal member is prevented from moving from its first position to its second position axially extending from said housing.

12. A combination hydraulic cylinder and safety valve as recited in claim 11 and further comprising first means for preventing said longitudinal member from sliding outwardly beyond its second position.

13. A combination hydraulic cylinder and safety valve as recited in claim 12 wherein said first means comprise a peripheral abutment surface on said longitudinal member and a cooperating abutment surface in said longitudinal bore.

14. A combination hydraulic cylinder and safety valve as recited in claim 11 and further comprising second means for adjusting the rating of said one-way valve.

15. A combination hydraulic cylinder and safety valve as recited in claim 11 wherein said third path of fluid communication comprises an annular relief in said longitudinal member.

* * * * *